J. RYAN.
Running-Gears for Wagons.

No. 153,204. Patented July 21, 1874.

Witnesses,
W<sup>m</sup> Hill
Luke Hill

Inventor
John Ryan

UNITED STATES PATENT OFFICE.

JOHN RYAN, OF UTICA, ASSIGNOR OF ONE-HALF HIS RIGHT TO LEWIS W. BABCOCK, OF WHITESTOWN, NEW YORK.

IMPROVEMENT IN RUNNING-GEARS FOR WAGONS.

Specification forming part of Letters Patent No. 153,204, dated July 21, 1874; application filed September 19, 1873.

*To all whom it may concern:*

Be it known that I, JOHN RYAN, of the city of Utica, county of Oneida and State of New York, have invented a Double-Action Wagon-Gear, of which the following is a specification:

The object of my invention is to so construct a wagon-gear that the wagon may be turned about within a much smaller space than that required by a wagon as usually made.

My invention will be readily understood by reference to the accompanying drawings, of which—

Figure 1:
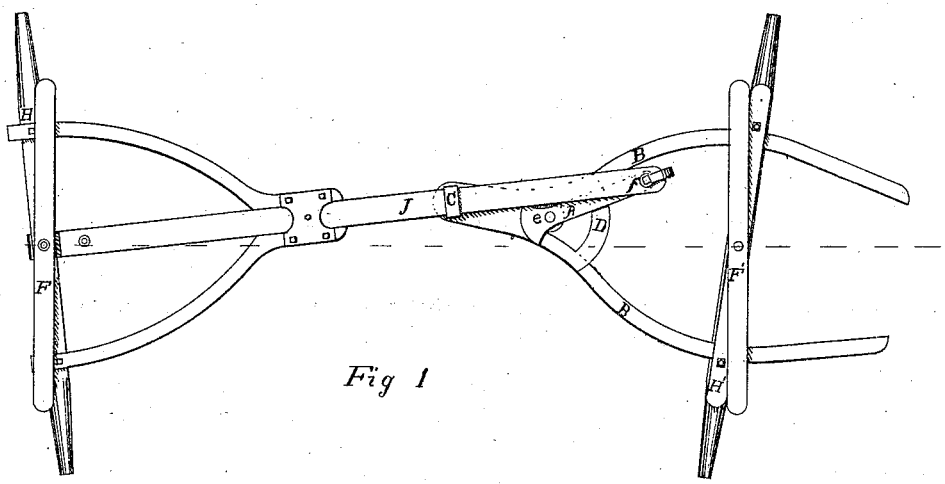
Figure 2:
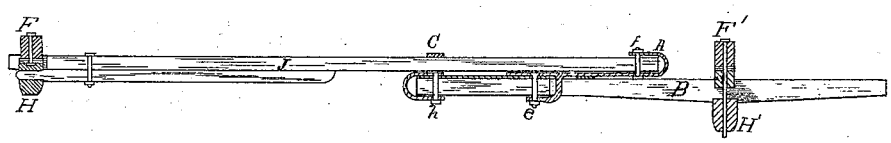

Figure 1 is a general plan view; Fig. 2, a vertical longitudinal section of the center; and Fig. 3 is a portion of the hounds with my invention attached thereto and all the other parts removed.

Figure 3:
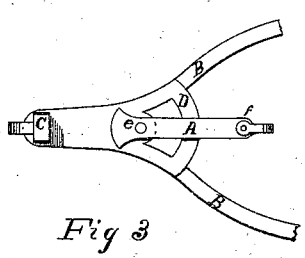

My invention consists of a link, A, attached by a round bolt near its back end to an extension of the hounds B B, or their equivalents, at e, Figs. 1, 2, and 3, and having the reach J attached to its front end, at f, by a bolt, on which the reach may turn freely; also, a swivel-stirrup, C, which has a round shank passing through the extension of the hounds, as shown at h, Fig. 2, through which stirrup the reach J is passed before being connected to the link A. The upper surface of the extension of the hounds is covered with a plate of iron, of which the circle D is a part, which supports the link A and prevents undue wear of the parts. Both bolsters F and F' are attached to the axles H and H by a single bolt in the center of each, that they may be kept in their proper position by the body of the wagon.

It is apparent that when the front axle H is turned from a right angle with the center line, carrying with it the hounds B B and stirrup C, the reach J will be thrown from the center line, as shown in Fig. 1, turning the rear axle H diagonal to the center line also, but in the direction opposite to that of the front axle, whereby the wagon may be turned in much less space than if the reach were attached to the center of the front axle in the ordinary way.

I claim as my invention—

The combination of link A, stirrup C, and reach J, substantially as and for the purpose specified.

JOHN RYAN.

Witnesses:
WILLIAM HILL,
LUKE HILL.